US012764748B2

(12) United States Patent
Wu et al.

(10) Patent No.: US 12,764,748 B2
(45) Date of Patent: Oct. 13, 2026

(54) METHOD AND DEVICE FOR CONTROL CHANNEL MONITORING BASED ON SPATIAL-STATE GROUPING

(71) Applicant: Apogee 5G Global, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 470 days.

(21) Appl. No.: 17/973,504

(22) Filed: Oct. 25, 2022

(65) Prior Publication Data

US 2023/0049517 A1 Feb. 16, 2023

Related U.S. Application Data

(63) Continuation of application No. PCT/CN2022/082063, filed on Mar. 21, 2022.

(30) Foreign Application Priority Data

Mar. 22, 2021 (CN) ........................ 202110300135.X

(51) Int. Cl.
*H04W 72/23* (2023.01)
*H04L 5/00* (2006.01)

(52) U.S. Cl.
CPC ........... *H04W 72/23* (2023.01); *H04L 5/0051* (2013.01); *H04L 5/0053* (2013.01)

(58) Field of Classification Search
CPC ..... H04L 5/0051; H04L 5/0053; H04W 72/23
(Continued)

(56) References Cited

U.S. PATENT DOCUMENTS

2020/0229008 A1* 7/2020 Islam .................... H04L 5/0094
2021/0006376 A1* 1/2021 Cirik ..................... H04L 5/0094
(Continued)

FOREIGN PATENT DOCUMENTS

CN 111106915 A 5/2020

OTHER PUBLICATIONS

ISR received in application No. PCT/CN2022/082063 dated Jun. 10, 2022.
(Continued)

*Primary Examiner* — Asad M Nawaz
*Assistant Examiner* — Hugh Mark Ashley
(74) *Attorney, Agent, or Firm* — Volpe Koenig

(57) ABSTRACT

The present disclosure provides a method and a device in a node for wireless communications. A first node determines a first resource set and a first resource set group from M resource sets; and monitors a first-type channel in the first resource set group in a first time window. Any two of the M resource sets are overlapping in time domain, and the first resource set group comprises the first resource set; any of the M resource sets is linked to one or two spatial states; a second resource set is any of the M resource sets different from the first resource set; whether a first condition is fulfilled is used to determine whether the second resource set belongs to the first resource set group. The above method avoids performance loss resulting from the UE's unnecessary abandonment of monitoring over some PDCCH candidates.

10 Claims, 4 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2021/0235431 | A1* | 7/2021 | Liu ..................... | H04W 72/543 |
| 2024/0306015 | A1* | 9/2024 | Matsumura ........... | H04L 5/0053 |

OTHER PUBLICATIONS

Vivo "Enhancements on Multi-TRP for PDCCH, PUCCH and PUSCH" 3GPP TSG RAN WG1 #104-e R1-2100422 Jan. 19, 2021.
InterDigital, Inc "Reliability Enhancements for PDCCH, PUCCH, and PUSCH" 3GPP TSG RAN WG1 #103-e R1-2007627 Nov. 2, 2020.
Third Generation Partnership Project, "Technical Specification Group Radio Access Network; NR; Physical channels and modulation (Release 16)," 3GPP TS 38.211 V16.4.0 (Dec. 2020).
Third Generation Partnership Project, "Technical Specification Group Radio Access Network; NR; Multiplexing and channel coding (Release 16)," 3GPP TS 38.212 V16.4.0 (Dec. 2020).
Third Generation Partnership Project, "Technical Specification Group Radio Access Network; NR; Physical layer procedures for control (Release 16)," 3GPP TS 38.213 V16.4.0 (Dec. 2020).
Third Generation Partnership Project, "Technical Specification Group Radio Access Network; NR; Physical layer procedures for data (Release 16)," 3GPP TS 38.214 V16.4.0 (Dec. 2020).

* cited by examiner

METHOD AND DEVICE FOR CONTROL CHANNEL MONITORING BASED ON SPATIAL-STATE GROUPING

CROSS REFERENCE TO RELATED APPLICATIONS

This application is the continuation of the International patent application No. PCT/CN2022/082063, filed on Mar. 21, 2022, which claims the priority benefit of Chinese Patent Application No. 202110300135.X, filed on Mar. 22, 2021, the full disclosure of which is incorporated herein by reference.

BACKGROUND

Technical Field

The present disclosure relates to transmission methods and devices in wireless communication systems, and in particular to a method and device for radio signal transmission in a wireless communication system supporting cellular networks.

Related Art

The Multi-antenna technique is a crucial part in the 3rd Generation Partner Project (3GPP) Long-term Evolution (LTE) and New Radio (NR) systems. More than one antenna can be configured, at the communication node, e.g., a base station or a User Equipment (UE), to obtain extra degree of freedom in space. Multiple antennas form through beamforming a beam pointing in a specific direction to enhance the communication quality. When the multiple antennas belong to multiple Transmitter Receiver Points (TRPs)/panels, spatial differences between TRPs/panels can be taken advantage of to obtain extra diversity/multiplexing gains. In NR Release (R)16, multi-TRP based repeated transmissions will be used to increase the reliability of downlink physical layer data channel transmission.

SUMMARY

In NR R17 and subsequent versions, the multi-TRP/panel-based transmission scheme will proceed evolution, one important aspect is its usage for advancement of physical layer control channel. At the 3GPP Radio Access Network (RAN) 1 #103-e conference, a scheme of assigning two activated Transmission Configuration Indicator (TCI) states for a same COntrol REsource SET (CORESET) and a scheme of combined decoding between two Physical Downlink Control Channel (PDCCH) candidates associated with different CORESETs are approved. In NR R16, for PDCCH candidates overlapping in time domain, a UE only needs to monitor a PDCCH candidate among them sharing a same Quasi Co-Location (QCL)-type D property with a specific CORESET. When a PDCCH candidate is related to two TCI states, what influence will be incurred upon the monitoring on PDCCH candidates overlapping in time domain is an issue to be addressed.

To address the above problem, the present disclosure provides a solution. It should be noted that although the statement above only took the multi-TRP/panel transmission and control channel transmission scenarios as an example, the present disclosure also applies to other scenarios like single-TRP/panel transmission, other physical layer channels, Carrier Aggregation or V2X, where similar technical effects to those in multi-TRP/panel ones can be achieved. Additionally, the adoption of a unified solution for various scenarios, including but not limited to multi-TRP/panel transmission, single-TRP/panel transmission, control channel and other physical layer channels, Carrier Aggregation, and IoT, contributes to the reduction of hardcore complexity and costs. In the case of no conflict, the embodiments of a first node and the characteristics in the embodiments may be applied to a second node, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

- determining a first resource set and a first resource set group from M resource sets, where M is a positive integer greater than 1; and
- monitoring a first-type channel in the first resource set group in a first time window;
- herein, any two of the M resource sets are overlapping in time domain in the first time window, and the first resource set group comprises the first resource set; any resource set among the M resource sets is connected with one or two spatial states; a second resource set is any of the M resource sets different from the first resource set; whether a first condition is fulfilled is used to determine whether the second resource set belongs to the first resource set group; the first condition is related to the number of spatial state(s) with which the second resource set is connected; the first resource set is connected with a target spatial state; when the second resource set is connected with only a first spatial state, the first condition comprises the first spatial state and the target spatial state being configured with same properties for a first QCL Type; when the second resource set is connected with a first spatial state and a second spatial state, the first condition comprises a default spatial state of the first spatial state and the second spatial state being configured with same properties for the first QCL Type as the target spatial state, or, the first condition comprises there being a spatial state of the first and the second spatial states being configured with a same property/properties for the first QCL Type as the target spatial state.

In one embodiment, a problem to be solved in the present disclosure includes: how to determine PDCCH candidate(s) in need of being monitored when there is one PDCCH candidate among time-domain overlapping PDCCH candidates being related to two TCI states. The method above determines whether it is required to monitor PDCCH candidate(s) in the second resource set respectively depending on whether the second resource set is connected with one or two spatial states, hence the solution to the above problem.

In one embodiment, characteristics of the above method include: the M resource sets comprise PDCCH candidates overlapping in time domain, wherein each PDCCH candidate comprised by the first resource set needs to be monitored, while the second resource set is any resource set different from the first resource set; the determination of whether to monitor PDCCH candidates or not in the second resource set depends on whether the second resource set is connected with one or two spatial states.

In one embodiment, an advantage of the above method includes: by determining PDCCH candidates that can be monitored simultaneously according to the UE capability, some performance loss which may result from unnecessarily dropped monitoring on certain PDCCH candidates can be avoided.

In one embodiment, an advantage of the above method includes: increasing the degree of freedom of scheduling by the base station in cases when PDCCH candidates are overlapping in time domain.

According to one aspect of the present disclosure, a given resource set is any resource set among the M resource sets, with a first search space set being associated with the given resource set; if the first search space set and a second search space set are linked, the given resource set is connected with a fifth spatial state; the fifth spatial state is used for configuring (a) QCL relation(s) between a DMRS port for a PDCCH being transmitted in the second search space set and one or two reference signals.

According to one aspect of the present disclosure, when the second resource set is connected with the first spatial state and the second spatial state, whether a second condition set is fulfilled is used to determine the first condition; when the second condition set is fulfilled, the first condition comprises there being a spatial state of the first and the second spatial states being configured with a same property/properties for the first QCL Type as the target spatial state; when the second condition set is unfulfilled, the first condition comprises a default spatial state of the first spatial state and the second spatial state being configured with same properties for the first QCL Type as the target spatial state.

According to one aspect of the present disclosure, characterized in that the second condition set comprises a second condition, the second condition comprising the first node being configured with a first higher-layer parameter and the first higher-layer parameter's value belonging to a first parameter value set, the first parameter value set comprising at least one parameter value.

According to one aspect of the present disclosure, characterized in that the first node is configured with K search space sets, where K is a positive integer greater than 1; the second condition set comprises a third condition, the third condition comprising there being a third search space set and a fourth search space set among the K search space sets, where there is one PDCCH candidate in the third search space set being connected with and overlapping in time domain with one PDCCH candidate in the fourth search space set.

According to one aspect of the present disclosure, characterized in comprising:

receiving first information;

herein, the first information is used to determine the first condition.

According to one aspect of the present disclosure, when the first resource set is connected with a third spatial state and a fourth spatial state, the target spatial state is a default spatial state of the third spatial state and the fourth spatial state, or, the target spatial state is any spatial state of the third spatial state and the fourth spatial state.

According to one aspect of the present disclosure, the first node is a UE.

According to one aspect of the present disclosure, the first node is a relay node.

The present disclosure provides a method in a second node for wireless communications, comprising:

transmitting or dropping transmission of a first-type channel in a first resource set group in a first time window;

herein, the first resource set group comprises at least one of M resource sets, M being a positive integer greater than 1; any two of the M resource sets are overlapping in time domain in the first time window; a target receiver for the first-type channel determines a first resource set and the first resource set group from the M resource sets, and monitors the first-type channel in the first resource set group; the first resource set group comprises the first resource set; any of the M resource sets is connected with one or two spatial states; a second resource set is any of the M resource sets different from the first resource set; whether a first condition is fulfilled is used to determine whether the second resource set belongs to the first resource set group; the first condition is related to the number of spatial state(s) with which the second resource set is connected; the first resource set is connected with a target spatial state; when the second resource set is connected with only a first spatial state, the first condition comprises the first spatial state and the target spatial state being configured with same properties for a first QCL Type; when the second resource set is connected with a first spatial state and a second spatial state, the first condition comprises a default spatial state of the first spatial state and the second spatial state being configured with same properties for the first QCL Type as the target spatial state, or, the first condition comprises there being a spatial state of the first and the second spatial states being configured with a same property/properties for the first QCL Type as the target spatial state.

According to one aspect of the present disclosure, a given resource set is any resource set among the M resource sets, with a first search space set being associated with the given resource set; if the first search space set and a second search space set are linked, the given resource set is connected with a fifth spatial state; the fifth spatial state is used for configuring (a) QCL relation(s) between a DMRS port for a PDCCH being transmitted in the second search space set and one or two reference signals.

According to one aspect of the present disclosure, when the second resource set is connected with the first spatial state and the second spatial state, whether a second condition set is fulfilled is used to determine the first condition; when the second condition set is fulfilled, the first condition comprises there being a spatial state of the first and the second spatial states being configured with a same property/properties for the first QCL Type as the target spatial state; when the second condition set is unfulfilled, the first condition comprises a default spatial state of the first spatial state and the second spatial state being configured with same properties for the first QCL Type as the target spatial state.

According to one aspect of the present disclosure, characterized in that the second condition set comprises a second condition, the second condition comprising the target receiver for the first-type channel being configured with a first higher-layer parameter and the first higher-layer parameter's value belonging to a first parameter value set, the first parameter value set comprising at least one parameter value.

According to one aspect of the present disclosure, characterized in that the target receiver for the first-type channel is configured with K search space sets, where K is a positive integer greater than 1; the second condition set comprises a third condition, the third condition comprising there being a third search space set and a fourth search space set among the K search space sets, where there is one PDCCH candidate in the third search space set being connected with and overlapping in time domain with one PDCCH candidate in the fourth search space set.

According to one aspect of the present disclosure, characterized in comprising:

transmitting first information;

herein, the first information is used to determine the first condition.

According to one aspect of the present disclosure, when the first resource set is connected with a third spatial state and a fourth spatial state, the target spatial state is a default spatial state of the third spatial state and the fourth spatial state, or, the target spatial state is any spatial state of the third spatial state and the fourth spatial state.

According to one aspect of the present disclosure, the second node is a base station.

According to one aspect of the present disclosure, the second node is a UE.

According to one aspect of the present disclosure, the second node is a relay node.

The present disclosure provides a first node for wireless communications, comprising:

a first processor, determining a first resource set and a first resource set group from M resource sets, and monitoring a first-type channel in the first resource set group in a first time window, where M is a positive integer greater than 1;

herein, any two of the M resource sets are overlapping in time domain in the first time window, and the first resource set group comprises the first resource set; any resource set among the M resource sets is connected with one or two spatial states; a second resource set is any of the M resource sets different from the first resource set; whether a first condition is fulfilled is used to determine whether the second resource set belongs to the first resource set group; the first condition is related to the number of spatial state(s) with which the second resource set is connected; the first resource set is connected with a target spatial state; when the second resource set is connected with only a first spatial state, the first condition comprises the first spatial state and the target spatial state being configured with same properties for a first QCL Type; when the second resource set is connected with a first spatial state and a second spatial state, the first condition comprises a default spatial state of the first spatial state and the second spatial stats being configured with same properties for the first QCL Type as the target spatial state, or, the first condition comprises there being a spatial state of the first and the second spatial states being configured with a same property/properties for the first QCL Type as the target spatial state.

The present disclosure provides a second node for wireless communications, comprising:

a second processor, transmitting or dropping transmission of a first-type channel in a first resource set group in a first time window;

herein, the first resource set group comprises at least one of M resource sets, M being a positive integer greater than 1; any two of the M resource sets are overlapping in time domain in the first time window; a target receiver for the first-type channel determines a first resource set and the first resource set group from the M resource sets, and monitors the first-type channel in the first resource set group; the first resource set group comprises the first resource set; any of the M resource sets is connected with one or two spatial states; a second resource set is any of the M resource sets different from the first resource set; whether a first condition is fulfilled is used to determine whether the second resource set belongs to the first resource set group; the first condition is related to the number of spatial state(s) with which the second resource set is connected; the first resource set is connected with a target spatial state; when the second resource set is connected with only a first spatial state, the first condition comprises the first spatial state and the target spatial state being configured with same properties for a first QCL Type; when the second resource set is connected with a first spatial state and a second spatial state, the first condition comprises a default spatial state of the first spatial state and the second spatial state being configured with same properties for the first QCL Type as the target spatial state, or, the first condition comprises there being a spatial state of the first and the second spatial states being configured with a same property/properties for the first QCL Type as the target spatial state.

In one embodiment, compared with the prior art, the present disclosure is advantageous in the following aspects:

by determining PDCCH candidates that can be monitored simultaneously according to the UE capability, some performance loss due to unnecessarily dropped monitoring on certain PDCCH candidates can be avoided;

increasing the degree of freedom of scheduling by the base station when PDCCH candidates are overlapping in time domain.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
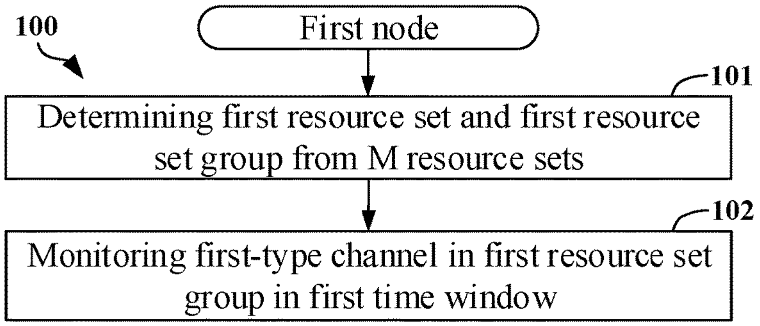
FIG. 1 illustrates a flowchart of M resource sets, a first resource set, a first resource set group and a first-type channel according to one embodiment of the present disclosure.

Embodiment 1 illustrates a flowchart of M resource sets, a first resource set, a first resource set group and a first-type channel according to one embodiment of the present disclosure, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present disclosure determines a first resource set and a first resource set group from M resource sets in step 101, and monitors a first-type channel in the first resource set group in a first time window in step 102. Herein, M is a positive integer greater than 1; any two of the M resource sets are overlapping in time domain in the first time window, and the first resource set group comprises the first resource set; any resource set among the M resource sets is connected with one or two spatial states; a second resource set is any of the M resource sets different from the first resource set; whether a first condition is fulfilled is used to determine whether the second resource set belongs to the first resource set group; the first condition is related to the number of spatial state(s) with which the second resource set is connected; the first resource set is connected with a target spatial state; when the second resource set is connected with only a first spatial state, the first condition comprises the first spatial state and the target spatial state being configured with same properties for a first QCL Type; when the second resource set is connected with a first spatial state and a second spatial state, the first condition comprises a default spatial state of the first spatial state and the second spatial state being configured with same properties for the first QCL Type as the target spatial state, or, the first condition comprises there being a spatial state of the first spatial state and the second spatial state being configured with same properties for the first QCL Type as the target spatial state.

In one embodiment, when the second resource set is connected with only the first spatial state, the first condition comprises the first spatial state and the target spatial state being configured with same properties for the first QCL type; when the second resource set is connected with both the first spatial state and the second spatial state, the first condition comprises a default spatial state of the first spatial state and the second spatial state being configured with a same property/properties for the first QCL Type as the target spatial state, or, the first condition comprises there being a spatial state of the first and the second spatial states being configured with a same property/properties for the first QCL Type as the target spatial state.

In one embodiment, when the second resource set is connected with the first spatial state and the second spatial state, the first condition comprises a default spatial state of the first spatial state and the second spatial state being configured with same properties for the first QCL Type as the target spatial state.

In one embodiment, when the second resource set is connected with the first spatial state and the second spatial state, the first condition comprises there being a spatial state of the first spatial state and the second spatial state being configured with same properties for the first QCL Type as the target spatial state.

In one embodiment, if the first condition comprises a default spatial state of the first and the second spatial states being configured with same properties for the first QCL Type as the target spatial state, then when the other spatial state of the first and the second spatial states different from the default spatial state is configured with a same property/properties for the first QCL Type as the target spatial state but the default one is configured with a different property/properties for the first QCL Type from the target spatial state, the first condition is unfulfilled.

In one embodiment, when the first condition comprises there being a spatial state of the first and the second spatial states being configured with a same property/properties for the first QCL Type as the target spatial state, no matter which one of the first and the second spatial states is configured with a same property/properties for the first QCL Type as the target spatial state, the first condition is fulfilled.

In one embodiment, M is no greater than 5.

In one embodiment, M is no greater than 3.

In one embodiment, M is no greater than 8.

In one embodiment, the M resource sets respectively comprise M CORESETs.

In one embodiment, the M resource sets are respectively M CORESETs.

In one embodiment, the M resource sets respectively comprise M search space sets.

In one embodiment, any of the M resource sets comprises a positive integer number of PDCCH candidate(s).

In one embodiment, the M resource sets respectively comprise PDCCH candidates for M CORESETs that occur in the first time window.

In one embodiment, the M resource sets are respectively comprised of PDCCH candidates for M CORESETs that occur in the first time window.

In one embodiment, any of the M resource sets comprises a time-frequency resource.

In one embodiment, any of the M resource sets occupies more than one Resource Element (RE) in time-frequency domain.

In one embodiment, an RE occupies a symbol in time domain, and a subcarrier in frequency domain.

In one embodiment, the symbol is an Orthogonal Frequency Division Multiplexing (OFDM) Symbol.

In one embodiment, the symbol is a Single Carrier-Frequency Division Multiple Access (SC-FDMA) symbol.

In one embodiment, the symbol is a Discrete Fourier Transform Spread OFDM (DFT-S-OFDM) symbol.

In one embodiment, any of the M resource sets occupies multiple subcarriers in frequency domain.

In one embodiment, any of the M resource sets occupies at least one Physical Resource Block (PRB) in frequency domain.

In one embodiment, any of the M resource sets occupies at least one symbol in time domain.

In one embodiment, any of the M resource sets occupies at least one slot in time domain.

In one embodiment, there is a resource set among the M resource sets that occurs only once in time domain.

In one embodiment, there is a resource set among the M resource sets that occurs multiple times in time domain.

In one embodiment, any of the M resource sets occurs multiple times in time domain.

In one embodiment, there is a resource set among the M resource sets that occurs periodically in time domain.

In one embodiment, there is a resource set among the M resource sets that occurs aperiodically in time domain.

In one embodiment, the M resource sets belong to a same Carrier.

In one embodiment, the M resource sets belong to a same BandWidth Part (BWP).

In one embodiment, the M resource sets belong to a same Cell.

In one embodiment, there are two resource sets among the M resource sets that belong to different Carriers.

In one embodiment, there are two resource sets among the M resource sets that belong to different BWPs.

In one embodiment, there are two resource sets among the M resource sets that belong to different cells.

In one embodiment, there are two resource sets among the M resource sets that respectively belong to active downlink BWPs of different cells.

In one embodiment, the M resource sets are respectively identified by M resource set indexes, where the M resource set indexes are M non-negative integers, respectively.

In one subembodiment, the M resource set indexes are mutually unequal.

In one subembodiment, the M resource sets are divided into M1 groups, M1 being a positive integer no greater than M; any one of the M1 groups comprises at least one of the M resource sets, for any given group among the M1 groups, if a number of resource sets comprised in the given group is larger than 1, all resource sets comprised in the given group belong to a same cell and resource set indexes for any two resource sets comprised in the given group are unequal.

In one embodiment, the M resource set indexes respectively comprise M ControlResourceSetIds.

In one embodiment, the M resource set indexes are respectively M ControlResourceSetIds.

In one embodiment, the M resource set indexes respectively comprise M SearchSpaceIds.

In one embodiment, the first resource set group comprises at least one resource set.

In one embodiment, the first resource set group comprises at least one resource set among the M resource sets.

In one embodiment, the first resource set group comprises at least one resource set other than the first resource set.

In one embodiment, the first resource set group comprises only the first resource set.

In one embodiment, any resource set in the first resource set group is one of the M resource sets.

In one embodiment, the first resource set group comprises all the M resource sets.

In one embodiment, there is one resource set among the M resource sets that does not belong to the first resource set group.

In one embodiment, the first resource set group comprises each resource set among the M resource sets that fulfills the first condition.

In one embodiment, indexes for cells to which the M resource sets respectively belong are used to determine the first resource set out of the M resource sets.

In one embodiment, indexes for search space sets associated with each of the M resource sets are used to determine the first resource set out of the M resource sets.

In one embodiment, indexes for search space sets in cells to which the M resource sets respectively belong are used to determine the first resource set out of the M resource sets.

In one embodiment, resource set indexes for the M resource sets are used to determine the first resource set out of the M resource sets.

In one embodiment, each CORESETpoolIndex for a resource set of the M resource sets is used to determine the first resource set out of the M resource sets.

In one embodiment, whether there is a Common Search Space (CSS) set being associated with one or more of the M resource sets is used to determine the first resource set out of the M resource sets.

In one embodiment, if there is a CSS set being associated with one of the M resource sets, the first resource set is a resource set associated with a first CSS set among the M resource sets; the first CSS set is a CSS set having a smallest search space set index for a cell having a smallest cell index among cells that comprise CSS sets.

In one subembodiment, the first CSS set is a CSS set having a smallest search space set index for a cell having a smallest cell index while comprising CSS sets among cells to which the M resource sets respectively belong.

In one embodiment, if for any resource set among the M resource sets, there isn't a CSS set being associated with the resource set, the first resource set is a resource set with which a first UE-specific Search Space set is associated among the M resource sets; the first USS set is a USS set having a smallest search space set index among USS sets comprising at least one PDCCH candidate within the first time window in time domain for a cell having a smallest cell index.

In one subembodiment, the first USS set is a USS set having a smallest search space set index among USS sets comprising at least one PDCCH candidate within the first time window in time domain for a cell having a smallest cell index among cells that the M resource sets respectively belong to.

In one embodiment, the first resource set is a resource set corresponding to a smallest resource set index among the M resource sets.

In one embodiment, the first resource set is a resource set corresponding to a smallest resource set index of all resource sets belonging to a first cell among the M resource sets; the first cell is a cell corresponding to a smallest cell index among cells to which the M resource sets respectively belong.

In one embodiment, the first time window is a contiguous time period.

In one embodiment, the first time window comprises one or more than one consecutive symbols.

In one embodiment, the number of symbols comprised in the first time window is no greater than 14.

In one embodiment, the first time window comprises at least one PDCCH monitoring occasion.

In one embodiment, the first time window comprises M PDCCH monitoring occasions, the M PDCCH monitoring occasions respectively belong to the M resource sets, and any two PDCCH monitoring occasions among the M PDCCH monitoring occasions are overlapping in time domain.

In one subembodiment, the first time window is composed of the M PDCCH monitoring occasions.

In one embodiment, the phrase that any two of the M resource sets are overlapping in time domain in the first time window means that the any two resource sets respectively comprise a first given PDCCH candidate and a second given PDCCH candidate, a PDCCH monitoring occasion to which the first given PDCCH candidate belongs and a PDCCH monitoring occasion to which the second given PDCCH candidate belongs both belong to the first time window and are overlapping in time domain.

In one embodiment, the phrase of monitoring a first-type channel in the first resource set group in a first time window means: monitoring the first-type channel in a PDCCH candidate which is located within the first time window in the first resource set group in the first time window.

In one embodiment, the phrase of monitoring a first-type channel in the first resource set group in a first time window means: monitoring the first-type channel in a PDCCH monitoring occasion which is located within the first time window in the first resource set group in the first time window.

In one embodiment, the spatial state comprises a TCI state.

In one embodiment, the spatial state is a TCI state.

In one embodiment, the spatial state comprises a QCL relation.

In one embodiment, the spatial state is a QCL relation.

In one embodiment, the spatial state comprises a spatial relation.

In one embodiment, the spatial state indicates a QCL relation.

In one embodiment, a said spatial state indicates one or two reference signals.

In one embodiment, the spatial state indicates QCL relation(s) between a DeModulation Reference Signals (DMRS) port for a Physical Downlink Shared CHannel (PDSCH), or a DMRS port for a PDCCH or a port for a Channel State Information-Reference Signal (CSI-RS) and one or two reference signals.

In one embodiment, the first spatial state and the second spatial state respectively correspond to different TCI-State-Ids.

In one embodiment, the first spatial state indicates a first reference signal, while the second spatial state indicates a second reference signal, the first reference signal and the second reference signal being non-quasi co-located (non-QCL).

In one subembodiment, the first spatial state indicates that a QCL type corresponding to the first reference signal is the first QCL type, while the second spatial state indicates that a QCL type corresponding to the second reference signal is the first QCL type.

In one subembodiment, the first reference signal and the second reference signal are not Quasi Co-located while corresponding to the first QCL type.

In one subembodiment, the first reference signal comprises a CSI-RS or a Synchronization Signal/physical broadcast channel Block (SSB), while the second reference signal comprises a CSI-RS or an SSB.

In one embodiment, the target spatial state, the first spatial state and the second spatial state are respectively TCI states.

In one embodiment, the target spatial state, the first spatial state and the second spatial state are respectively QCL relations.

In one embodiment, the first QCL type is one of a QCL-TypeA, a QCL-TypeB, a QCL-TypeC or a QCL-TypeD.

In one embodiment, the first QCL type is QCL-TypeD.

In one embodiment, there is at least one resource set among the M resource sets being connected with two spatial states.

In one embodiment, there is at least one resource set among the M resource sets being connected with only one spatial state.

In one embodiment, a number of spatial state(s) being connected with any resource set among the M resource sets is equal to 1 or 2.

In one embodiment, when the second resource set is connected with just the first spatial state, the number of spatial state(s) connected with the second resource set is equal to 1; when the second resource set is connected with the first spatial state and the second spatial state, the number of spatial state(s) connected with the second resource set is equal to 2.

In one embodiment, when the second resource set is connected with the first spatial state and the second spatial state, at least one of the first and the second spatial states is used to configure (a) QCL relation(s) between a DMRS port for a PDCCH transmitted in the second resource set and one or two reference signals.

In one embodiment, when the second resource set is connected with the first spatial state and the second spatial state, the first and the second spatial states are respectively used to configure (a) QCL relation(s) between a DMRS port for a PDCCH transmitted in the second resource set and one or two reference signals.

In one embodiment, when the second resource set is connected with the first spatial state and the second spatial state, the QCL relation of a DMRS port for a PDCCH transmitted in the second resource set is unrelated to one of the first spatial state and the second spatial state.

In one embodiment, when the second resource set is connected with the first spatial state and the second spatial state, one of the first and the second spatial states is used to configure (a) QCL relation(s) between a DMRS port for a PDCCH transmitted in a resource set different from the second resource set and one or two reference signals.

In one embodiment, when the second resource set is connected with the first spatial state and the second spatial state, one of the first and the second spatial states is used to configure (a) QCL relation(s) between a DMRS port for a PDCCH transmitted in the second resource set and one or two reference signals; while the other of the two is used to configure QCL relation(s) between a DMRS port for a PDCCH transmitted in a resource set different from the second resource set and one or two reference signals.

In one embodiment, the resource set different from the second resource set and the second resource set are respectively identified by different resource set indexes.

In one embodiment, the resource set is a CORESET, the resource set different from the second resource set and the second resource set respectively correspond to different ControlResourceSetIds.

In one embodiment, the resource set different from the second resource set is a CORESET.

In one embodiment, the resource set different from the second resource set belongs to the M resource sets.

In one embodiment, the resource set different from the second resource set does not belong to the M resource sets.

In one embodiment, the resource set different from the second resource set and the second resource set belong to a same BWP.

In one embodiment, the resource set different from the second resource set is a search space set.

In one embodiment, there is a search space set associated with the resource set different from the second resource set connected with a search space set associated with the second resource set.

In one embodiment, the first resource set is only connected with the target spatial state.

In one embodiment, the first resource set is also connected with another spatial state other than the target spatial state.

In one embodiment, the phrase that a resource set is connected with two spatial states means that the resource set is simultaneously connected with two spatial states.

In one embodiment, the phrase that a resource set is connected with a spatial state means that the resource set is connected with just one spatial state.

In one embodiment, if the first condition is fulfilled, the second resource set belongs to the first resource set group.

In one embodiment, if the first condition is unfulfilled, the second resource set does not belong to the first resource set group.

In one embodiment, when and only when the first condition is fulfilled, the second resource set belongs to the first resource set group.

In one embodiment, when and only when the first condition is unfulfilled, the second resource set does not belong to the first resource set group.

In one embodiment, the phrase that a spatial state and another spatial state are configured with a same property/properties for the first QCL Type includes a meaning that the spatial state indicates a third reference signal and that a QCL type corresponding to the third reference signal is the first QCL Type, the other spatial state indicates a fourth reference signal and that a QCL type corresponding to the fourth reference signal is the first QCL Type; the third reference signal is the fourth reference signal, or, the third reference signal and the fourth reference signal are quasi co-located.

In one subembodiment, the spatial state is the first spatial state, and the other spatial state is the target spatial state.

In one subembodiment, the spatial state is either the first spatial state or the second spatial state, and the other spatial state is the target spatial state.

In one subembodiment, the spatial state is either the first spatial state or the second spatial state, and the other spatial state is the third spatial state or the fourth spatial state.

In one subembodiment, the third reference signal and the fourth reference signal are Quasi Co-located while corresponding to the QCL TypeD.

In one subembodiment, the first reference signal and the second reference signal are not Quasi Co-located, with a corresponding QCL type being the first QCL type.

In one subembodiment, the third reference signal comprises a CSI-RS.

In one subembodiment, the third reference signal comprises a Synchronization Signal/physical broadcast channel Block (SSB).

In one subembodiment, the fourth reference signal comprises a CSI-RS.

In one subembodiment, the fourth reference signal comprises an SSB.

In one subembodiment, the phrase that the third reference signal is the fourth reference signal means that the third reference signal and the fourth reference signal correspond to a same reference signal index; the reference signal index comprises at least one of an NZP-CSI-RS-ResourceId or an SSB-Index.

In one embodiment, the reference signal comprises a reference signal resource.

In one embodiment, the reference signal comprises a reference signal port.

In one embodiment, the meaning of default includes no need for configuration.

In one embodiment, the meaning of default includes no need for higher-layer signaling configuration.

In one embodiment, the meaning of default includes no need for configuration by a Radio Resource Control (RRC) signaling.

In one embodiment, the meaning of default includes no need for L1 signaling configuration.

In one embodiment, the meaning of default includes no need for physical-layer signaling configuration.

In one embodiment, the meaning of default includes being pre-defined.

In one embodiment, the meaning of default includes being configured by a higher-layer signaling.

In one embodiment, the meaning of default includes being configured by an RRC signaling.

In one embodiment, the meaning of default includes being determined according to a preset rule.

In one embodiment, the default spatial state of the first and the second spatial states is a spatial state corresponding to a smaller spatial state index of the first and the second spatial states.

In one embodiment, the default spatial state of the first and the second spatial states is a spatial state corresponding to a larger spatial state index of the first and the second spatial states.

In one embodiment, the spatial state is a TCI state, and the spatial state index is a TCI-StateId.

In one embodiment, the first spatial state is used to configure QCL relation(s) between a DMRS port for a PDCCH transmitted in the second resource set and one or two reference signals, while the second spatial state is used to configure QCL relation(s) between a DMRS port for a PDCCH transmitted in a resource set different from the second resource set and one or two reference signals.

In one subembodiment, the default spatial state is a spatial state of the first and the second spatial states corresponding to a resource set with a smaller resource set index.

In one subembodiment, if there is a search space set associated with the second resource set having a search space set index smaller than a minimum value of search space set indexes respectively corresponding to all search space sets associated with a resource set different from the second resource set, the default spatial state is the first spatial state; if a search space set index for any search space set associated with the second resource set is larger than a minimum value of search space set indexes respectively corresponding to all search space sets associated with a resource set different from the second resource set, the default spatial state is the second spatial state.

In one embodiment, the default spatial state of the first and the second spatial states is indicated by a higher-layer signaling.

In one embodiment, the default spatial state of the first and the second spatial states is indicated by an RRC signaling.

In one embodiment, a first information block indicates the first spatial state and the second spatial state in sequence, the default spatial state of the first and the second spatial states being one of the two spatial states that is indicated by the first information block.

In one subembodiment, the first information block comprises configuration information for the second resource set, the configuration information for the second resource set comprising one or more of a resource set index corresponding to the second resource set, a frequency-domain resource corresponding to the second resource set, a duration corresponding to the second resource set, a Control channel element (CCE)-to-Resource Element Group (REG) mapping type corresponding to the second resource set, a pre-coding granularity corresponding to the second resource set or a TCI state corresponding to the second resource set.

In one subembodiment, the first information block comprises all or part of information in an Information Element (IE).

In one subembodiment, the first information block is a ControlResourceSet IE corresponding to the second resource set.

In one subembodiment, the first information block is used for activating the first spatial state and the second spatial state for the second resource set.

In one subembodiment, the first information block comprises a Medium Access Control layer Control Element (MAC CE).

In one subembodiment, the first information block comprises a TCI State Indication for UE-specific PDCCH MAC CE.

Embodiment 2

Figure 2:
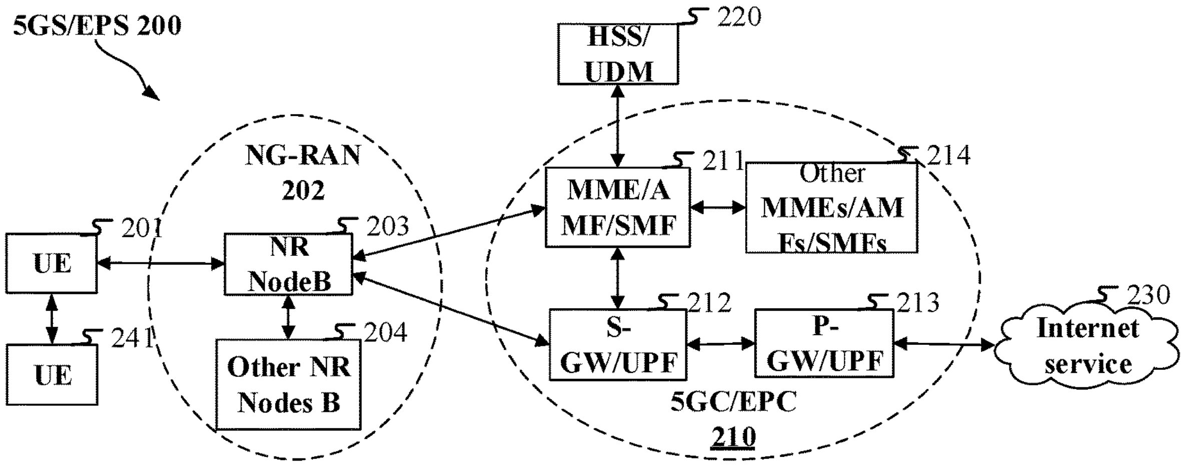
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The network architecture 200 LTE, LTE-A and future 5G systems may be called an Evolved Packet System (EPS) 200. The 5G NR or LTE network architecture 200 may be called a 5G System/Evolved Packet System (5GS/EPS) 200 or other suitable terminology. The 5GS/EPS 200 may comprise one or more UEs 201, a UE 241 in sidelink communication with UE(s) 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises a New Radio (NR) node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present disclosure includes the UE 201.

In one embodiment, the second node in the present disclosure includes the gNB 203.

In one embodiment, a radio link between the UE 201 and the gNB 203 is a cellular link.

In one embodiment, a transmitter for the first-type channel in the present disclosure includes the gNB 203.

In one embodiment, a receiver for the first-type channel in the present disclosure includes the UE 201.

Embodiment 3

Figure 3:
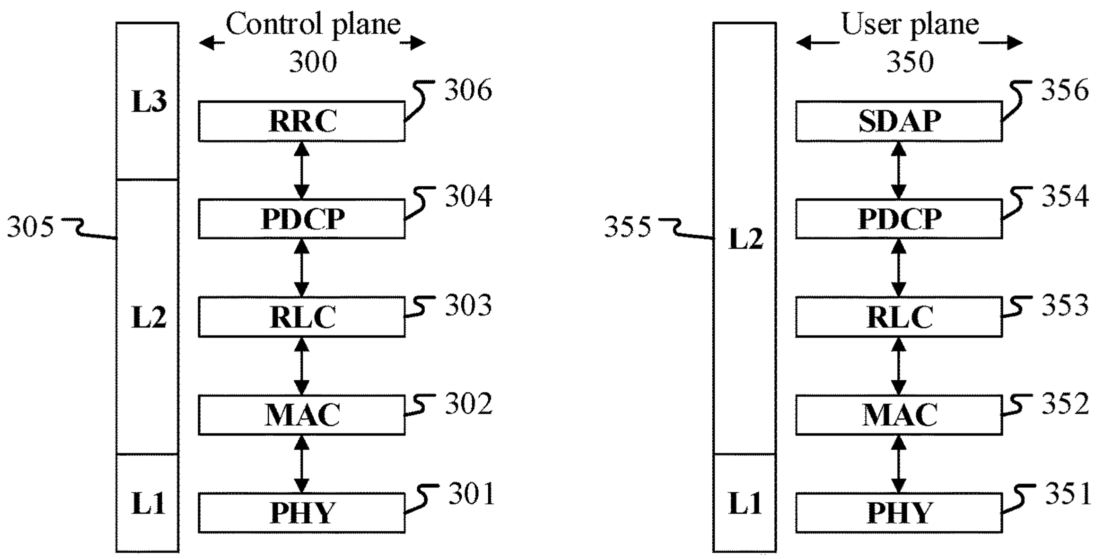
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first-type channel is generated by the PHY 301, or the PHY 351.

In one embodiment, the first information is generated by the PHY 301, or the PHY 351.

In one embodiment, the first information is generated by the MAC sublayer 352, or the MAC sublayer 302.

In one embodiment, the first information is generated by the RRC sublayer 306.

Embodiment 4

Figure 4:
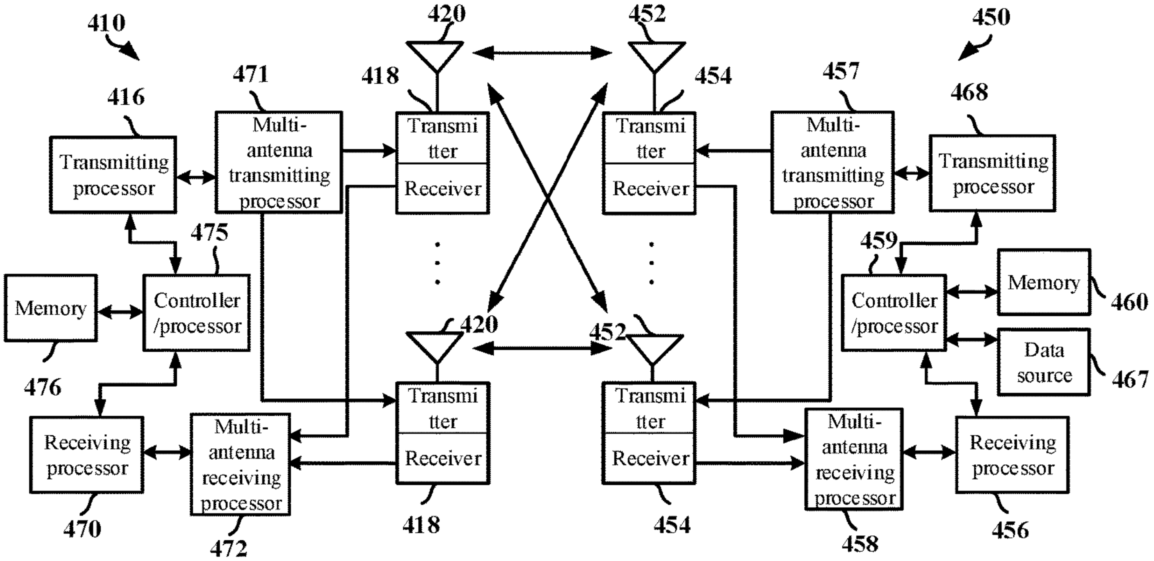
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least determines a first resource set and a first resource set group from M resource sets, and monitors a first-type channel in the first resource set group in the first time window.

In one embodiment, the second communication device 450 comprises a memory that stores computer readable instruction program, the computer readable instruction program generates an action when executed by at least one processor, which includes: determining a first resource set and a first resource set group from M resource sets; and monitoring a first-type channel in the first resource set group in the first time window.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits or drops transmission of the first-type channel in the first resource set group in the first time window.

In one embodiment, the first communication device 410 comprises a memory that stores computer readable instruction program, the computer readable instruction program generates an action when executed by at least one processor, which includes: transmitting or dropping transmission of the first-type channel in the first resource set group in the first time window.

In one embodiment, the first node in the present disclosure comprises the second communication device 450.

In one embodiment, the second node in the present disclosure comprises the first communication device 410.

In one embodiment, at least one of the receiving processor 456, the multi-antenna receiving processor 458, the controller/processor 459, the memory 460 or the data source 467 is used to determine the first resource set and the first resource set group from the M resource sets.

In one embodiment, at least one of the antenna 452, the receiver 454, the receiving processor 456, the multi-antenna receiving processor 458, the controller/processor 459, the memory 460 or the data source 467 is used to monitor the first-type channel in the first resource set group in the first time window; at least one of the antenna 420, the transmitter 418, the transmitting processor 416, the multi-antenna transmitting processor 471, the controller/processor 475 or the memory 476 is used to transmit the first-type channel in the first resource set group in the first time window.

In one embodiment, at least one of the antenna 452, the receiver 454, the receiving processor 456, the multi-antenna receiving processor 458, the controller/processor 459, the memory 460 or the data source 467 is used to receive the first information; at least one of the antenna 420, the transmitter 418, the transmitting processor 416, the multi-antenna transmitting processor 471, the controller/processor 475 or the memory 476 is used to transmit the first information.

Embodiment 5

Figure 5:
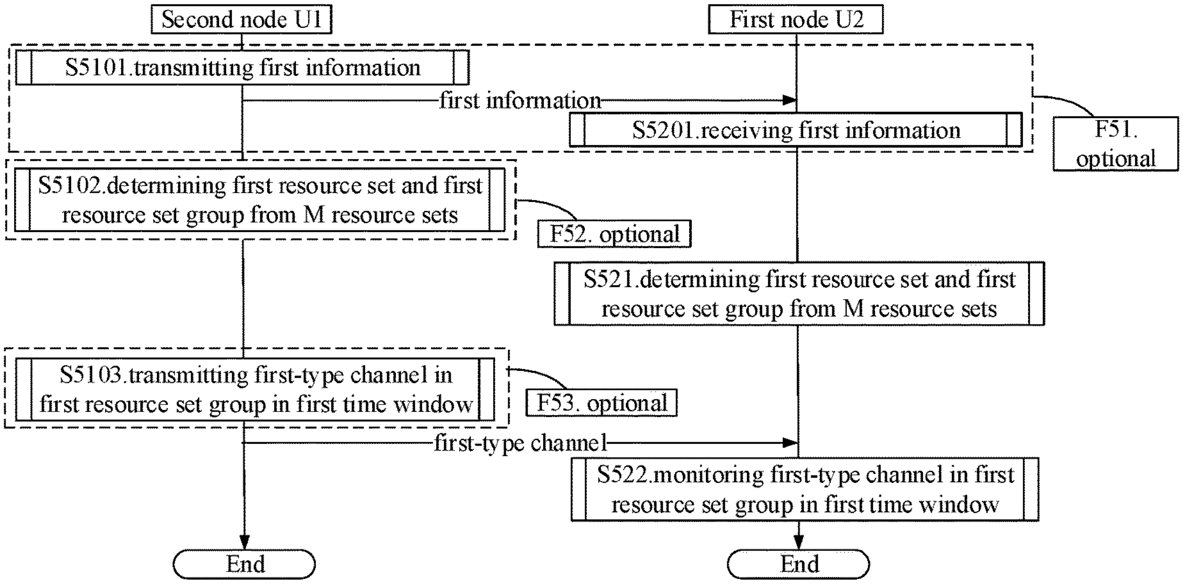
FIG. 5 illustrates a flowchart of transmission according to one embodiment of the present disclosure.

Embodiment 5 illustrates a flowchart of wireless transmission according to one embodiment of the present disclosure, as shown in FIG. 5. In FIG. 5, a second node U1 and a first node U2 are communication nodes in communications via an air interface. In FIG. 5, steps marked by boxes F51 to F53 are optional, respectively.

The second node U1 transmits first information in step S5101; and determines a first resource set and a first resource set group from M resource sets in step S5102; and transmits a first-type channel in a first resource set group in a first time window in step S5103.

The first node U2 receives first information in step S5201; and determines a first resource set and a first resource set group from M resource sets in step S521; and monitors a first-type channel in a first resource set group in a first time window in step S522.

In Embodiment 5; any two of the M resource sets are overlapping in time domain in the first time window, and the first resource set group comprises the first resource set; any resource set among the M resource sets is connected with one or two spatial states; a second resource set is any of the M resource sets different from the first resource set; whether a first condition is fulfilled is used by the first node U2 to determine whether the second resource set belongs to the first resource set group; the first condition is related to the number of spatial state(s) with which the second resource set is connected; the first resource set is connected with a target spatial state; when the second resource set is connected with only a first spatial state, the first condition comprises the first spatial state and the target spatial state being configured with same properties for a first QCL Type; when the second resource set is connected with a first spatial state and a second spatial state, the first condition comprises a default spatial state of the first spatial state and the second spatial state being configured with a same property/properties for the first QCL Type as the target spatial state, or, the first condition comprises there being a spatial state of the first and the second spatial states being configured with a same property/properties for the first QCL Type as the target spatial state.

In one embodiment, the first node U2 is the first node in the present disclosure.

In one embodiment, the second node U1 is the second node in the present disclosure.

In one embodiment, an air interface between the second node U1 and the first node U2 includes a radio interface between a base station and a UE.

In one embodiment, an air interface between the second node U1 and the first node U2 includes a radio interface between a UE and another UE.

In one embodiment, the second node U1 is a maintenance base station for a serving cell of the first node U2.

In one embodiment, the first node determines the first resource set out of the M resource sets according to a pre-determined rule.

In one embodiment, the first node determines the first resource set group out of the M resource sets according to the first condition.

In one embodiment, the phrase of monitoring a first-type channel in the first resource set group in a first time window means: monitoring the first-type channel only in the first resource set group in the M resource sets in the first time window.

In one embodiment, the above method in a first node for wireless communications comprises:

the first node dropping monitoring the first-type channel in any of the M resource sets not belonging to the first resource set group in the first time window.

In one embodiment, the above method in a first node for wireless communications comprises:

the first node dropping monitoring the first-type channel in a PDCCH candidate in any of the M resource sets not belonging to the first resource set group in the first time window.

In one embodiment, the above method in a first node for wireless communications comprises:

the first node autonomously determining the first condition.

In one embodiment, the first node autonomously determines the first condition according to a number of spatial state(s) connected with the second resource set.

In one embodiment, when the second resource set is connected with the first spatial state and the second spatial state, the first node autonomously determines the first condition.

In one embodiment, when the second resource set is connected with the first spatial state and the second spatial state, the first node autonomously determines whether the first condition comprises a default spatial state of the first spatial state and the second spatial state being configured with same properties for the first QCL Type as the target spatial state, or comprises there is one of the first and the second spatial states being configured with a same property/properties for the first QCL Type as the target spatial state.

In one embodiment, the steps marked by the box F51 in FIG. 5 exist; the first information is used by the first node to determine the first condition.

In one embodiment, the first information is transmitted on a PDSCH.

In one embodiment, the first information is transmitted on a PDCCH.

In one embodiment, the steps marked by the box F52 in FIG. 5 exist; the above method in a second node for wireless communications comprises:

determining the first resource set and the first resource set group out of the M resource sets.

In one embodiment, the second node determines the first resource set out of the M resource sets using a same way as in the first node.

In one embodiment, the second node determines the first resource set group out of the M resource sets using a same way as in the first node.

In one embodiment, whether the first condition is fulfilled is used by the second node U1 to determine whether the second resource set belongs to the first resource set group.

In one embodiment, the target receiver for the first-type channel is a target receiver for Downlink Control Information (DCI) transmitted in the first-type channel.

In one embodiment, steps marked by the box F53 in FIG. 5 exist, the second node transmits the first-type channel in the first resource set group in the first time window.

In one embodiment, steps marked by the box F53 in FIG. 5 do not exist, the second node drops transmitting the first-type channel in the first resource set group in the first time window.

In one embodiment, the second node autonomously determines whether to transmit or drop transmission of the first-type channel in the first resource set group in the first time window.

Embodiment 6

Figure 6:
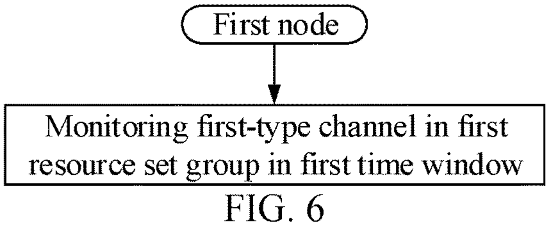
FIG. 6 illustrates a schematic diagram of a first node monitoring a first-type channel in a first resource set group in a first time window according to one embodiment of the present disclosure.

Embodiment 6 illustrates a schematic diagram of a first node monitoring a first-type channel in a first resource set group in a first time window according to one embodiment of the present disclosure; as shown in FIG. 6.

In one embodiment, the first-type channel comprises a physical channel.

In one embodiment, the first-type channel is a physical channel.

In one embodiment, the first-type channel comprises a layer 1 (L1) channel.

In one embodiment, the first-type channel is a layer 1 (L1) channel.

In one embodiment, the first-type channel includes a downlink physical layer control channel (i.e., a downlink channel only capable of bearing physical layer signaling).

In one embodiment, the first-type channel comprises a PDSCH.

In one embodiment, the first-type channel is a PDCCH.

In one embodiment, the first-type channel bears a PDCCH.

In one embodiment, the phrase of monitoring a first-type channel includes a meaning of monitoring a DCI format transmitted in the first-type channel.

In one embodiment, the phrase of monitoring a first-type channel includes a meaning of monitoring PDCCH candidates to determine whether the first-type channel is transmitted.

In one embodiment, the phrase of monitoring a first-type channel includes a meaning of monitoring PDCCH candidates to determine whether the first-type channel is transmitted in a PDCCH candidate.

In one embodiment, the phrase of monitoring a first-type channel includes a meaning of monitoring PDCCH candidates to determine whether a DCI format is detected in a PDCCH candidate.

In one embodiment, the phrase of monitoring a first-type channel includes a meaning of monitoring PDCCH candidates to determine whether a DCI format is detected as being transmitted in the first-type channel in a PDCCH candidate.

In one embodiment, the monitoring refers to blind decoding, the phrase of monitoring a first-type channel includes a meaning of performing decoding operation; if the decoding is determined to be correct according to a Cyclic Redundancy Check (CRC), it is then determined that a DCI format is detected; otherwise, it is determined that no DCI format is detected, In one embodiment, the monitoring refers to blind decoding, the phrase of monitoring a first-type channel includes a meaning of performing decoding operation; if the decoding is determined to be correct according to a CRC, it is then determined that a said first-type channel is detected; otherwise, it is determined that no such first-type channel is detected, In one embodiment, the monitoring refers to blind decoding, the phrase of monitoring a first-type channel includes a meaning of performing decoding operation; if the decoding is determined to be correct according to a CRC, it is then determined that a DCI format is detected to be transmitted in the first-type channel; otherwise, it is determined that no DCI format is detected.

In one embodiment, the monitoring refers to coherent detection, the phrase of monitoring a first-type channel includes a meaning of performing coherent reception and measuring energy of a signal obtained by the coherent reception; if the energy of the signal obtained by the coherent reception is greater than a first given threshold, it is then determined that a DCI format is detected to be transmitted in the first-type channel; otherwise, it is determined that no DCI format is detected.

In one embodiment, the monitoring refers to energy detection, the phrase of monitoring a first-type channel includes a meaning of sensing energies of radio signals and averaging them to acquire a received energy; if the received energy is greater than a second given threshold, it is then determined that a DCI format is detected to be transmitted in the first-type channel; otherwise, it is determined that no DCI format is detected.

In one embodiment, the phrase of monitoring a first-type channel includes a meaning of determining whether the first-type channel is to be transmitted according to CRC, before judging according to CRC whether decoding is correct, it is not determined whether the first-type channel is to be transmitted.

In one embodiment, the phrase of monitoring a first-type channel includes a meaning of determining whether there is DCI being transmitted in the first-type channel according to CRC, before judging according to CRC whether decoding is correct, it is not determined whether there is DCI being transmitted in the first-type channel.

In one embodiment, the phrase of monitoring a first-type channel includes a meaning of determining whether the first-type channel is to be transmitted according to coherent detection, before performing the coherent detection it is not determined whether the first-type channel is to be transmitted.

In one embodiment, the phrase of monitoring a first-type channel includes a meaning of determining whether there is DCI being transmitted in the first-type channel according to coherent detection; before performing the coherent detection it is not determined whether there is DCI being transmitted in the first-type channel.

In one embodiment, the phrase of monitoring a first-type channel includes a meaning of determining whether the first-type channel is to be transmitted according to energy detection, before performing the energy detection it is not determined whether the first-type channel is to be transmitted.

In one embodiment, the phrase of monitoring a first-type channel includes a meaning of determining whether there is DCI being transmitted in the first-type channel according to energy detection; before performing the energy detection it is not determined whether there is DCI being transmitted in the first-type channel.

Embodiment 7

Figure 7:
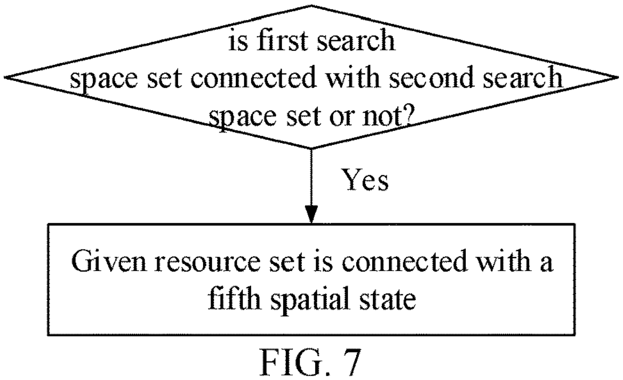
FIG. 7 illustrates a schematic diagram of a spatial state with which a given resource set is connected according to one embodiment of the present disclosure.

Embodiment 7 illustrates a schematic diagram of a spatial state with which a given resource set is connected according to one embodiment of the present disclosure; as shown in FIG. 7. In Embodiment 7, the given resource set is any resource set among the M resource sets, with the first search space set being associated with the given resource set; if the first search space set and the second search space set are connected, the given resource set is connected with the fifth spatial state; the fifth spatial state is used for configuring (a) QCL relation(s) between a DMRS port for a PDCCH being transmitted in the second search space set and one or two reference signals.

In one embodiment, the search space set is a search space set.

In one embodiment, the QCL refers to Quasi-Co-Location.

In one embodiment, the first search space set and the second search space set respectively comprise at least one PDCCH candidate.

In one embodiment, if the first search space set and the second search space set are connected, any PDCCH candidate in the first search space set is connected with a PDCCH candidate in the second search space set.

In one embodiment, if the first search space set and the second search space set are connected, there is a PDCCH candidate in the first search space set being connected with a PDCCH candidate in the second search space set.

In one embodiment, if the first search space set and the second search space set are connected, any PDCCH candidate in the second search space set is connected with any PDCCH candidate in the first search space set.

In one embodiment, if the first search space set and the second search space set are connected, there is a PDCCH candidate in the second search space set being connected with a PDCCH candidate in the first search space set.

In one embodiment, if there is one PDCCH candidate in the first search space set being connected with one PDCCH candidate in the second search space set, the first search space set and the second search space set are connected.

In one embodiment, if any PDCCH candidate in the first search space set is connected with a PDCCH candidate in the second search space set, the first search space set and the second search space set are connected.

In one embodiment, if any PDCCH candidate in the first search space set is connected with a PDCCH candidate in the second search space set and any PDCCH candidate in the second search space set is connected with a PDCCH candidate in the first search space set, the first search space set and the second search space set are connected.

In one embodiment, the meaning of any two search space sets being connected is similar to the meaning of the first search space set and the second search space set being connected, except for that the first search space set and the second search space set are replaced by the any two search space sets.

In one embodiment, a higher layer parameter is used for configuring whether the first search space set and the second search space set are connected.

In one embodiment, the first search space set and the second search space set belong to a same carrier.

In one embodiment, the first search space set and the second search space set belong to a same BWP.

In one embodiment, the first search space set and the second search space set belong to a same cell.

In one embodiment, the first search space set and the second search space set belong to different carriers.

In one embodiment, the first search space set and the second search space set belong to different BWPs.

In one embodiment, the first search space set and the second search space set belong to different cells.

In one embodiment, the first search space set and the second search space set are respectively identified by two different SearchSpaceIds.

In one embodiment, the first search space set and the second search space set are respectively two UE-specific Search Space (USS) sets.

In one embodiment, if two PDCCH candidates are connected, the first node performs combined decoding in the two PDCCH candidates.

In one embodiment, if two PDCCH candidates are connected, the first node can perform combined decoding in the two PDCCH candidates.

In one embodiment, if the first node performs combined decoding in two PDCCH candidates, the first node determines whether CRC is passed depending on the result of the combined decoding; if CRC is passed it is determined that a DCI format is detected to be transmitted in the first-type channel; otherwise, it is determined that no DCI format is detected.

In one embodiment, a first signal and a second signal are respectively transmitted in two PDCCH candidates, the first signal and the second signal respectively carrying DCI; if the two PDCCH candidates are connected, the first signal and the second signal carry a same bit block.

In one embodiment, if two PDCCH candidates are connected, the two PDCCH candidates respectively bear two repetitions of a same DCI transmission.

In one embodiment, a first signal and a second signal are respectively transmitted in two PDCCH candidates, the first signal and the second signal respectively carrying DCI; if the two PDCCH candidates are connected, the first node can assume that the first signal and the second signal carry a same bit block.

In one embodiment, if two PDCCH candidates are connected, the first node can assume that the two PDCCH candidates respectively bear two repetitions of a same DCI transmission.

In one embodiment, if two PDCCH candidates are connected, the first node is expected to receive a scheduling DCI for a first PDSCH in one of the two PDCCH candidates and receive a scheduling DCI for a second PDSCH in the other of the two PDSCH candidates, where the first PDSCH and the second PDSCH correspond to a same Hybrid Automatic Repeat reQuest (HARQ) process number; the first PDSCH and the second PDSCH are overlapping in time domain, or, the second PDSCH is earlier than an end time for an anticipated HARQ-ACK (Acknowledgment) transmission of the first PDSCH in time domain.

In one embodiment, if two PDCCH candidates are connected, a signal received in one of the two PDCCH candidates and a signal received in the other of the two PDCCH candidates are jointly used to determine whether a DCI format is detected to be transmitted in the first-type channel.

In one embodiment, if two PDCCH candidates are connected, a signal received in one of the two PDCCH candidates and a signal received in the other of the two PDCCH candidates can be jointly used to determine whether a DCI format is detected to be transmitted in the first-type channel.

In one embodiment, if two PDCCH candidates are connected, a total number of Blind Detections corresponding to the two PDCCH candidates is equal to a first number; if the two PDCCH candidates are not connected, a total number of Blind Detections corresponding to the two PDCCH candidates is equal to a second number; the first number is unequal to the second number.

In one subembodiment, the first number and the second number are respectively positive real numbers.

In one subembodiment, the first number and the second number are respectively positive integers.

In one subembodiment, the first number is greater than the second number.

In one subembodiment, the first number is less than the second number.

In one subembodiment, the blind detection refers to blind detection targeting PDCCHs.

In one embodiment, if two PDCCH candidates are disconnected, the first node cannot perform combined decoding in the two PDCCH candidates.

In one embodiment, a first signal and a second signal are respectively transmitted in two PDCCH candidates, the first signal and the second signal respectively carrying DCI; if the two PDCCH candidates are disconnected, the first node cannot assume that the first signal and the second signal carry a same bit block.

In one embodiment, if two PDCCH candidates are not connected, the first node cannot assume that the two PDCCH candidates respectively bear two repetitions of a same DCI transmission.

In one embodiment, if two PDCCH candidates are disconnected, the first node performs independent decoding respectively in the two PDCCH candidates.

In one embodiment, if two PDCCH candidates are disconnected, the first node is not expected to receive a scheduling DCI for a first PDSCH in one of the two PDCCH candidates and receive a scheduling DCI for a second PDSCH in the other of the two PDSCH candidates; the first PDSCH and the second PDSCH correspond to a same Hybrid Automatic Repeat reQuest (HARQ) process number; the first PDSCH and the second PDSCH are overlapping in time domain, or, the second PDSCH is earlier than an end time for an anticipated HARQ-ACK transmission of the first PDSCH in time domain.

In one embodiment, if two PDCCH candidates are disconnected, a signal received in one of the two PDCCH candidates and a signal received in the other of the two PDCCH candidates cannot be jointly used to determine whether a DCI format is detected to be transmitted in the first-type channel.

In one embodiment, the phrase of combined decoding comprises a meaning that modulation symbols are combined.

In one embodiment, the phrase of combined decoding comprises a meaning that modulation symbols are combined and then input to a demodulator.

In one embodiment, the phrase of combined decoding comprises a meaning that outputs by a demodulator are combined.

In one embodiment, the phrase of combined decoding comprises a meaning that outputs by a demodulator are combined and then input to a channel decoder.

In one embodiment, the phrase of combined decoding comprises a meaning that outputs by a channel decoder are combined.

In one embodiment, the phrase of combined decoding comprises a meaning of joint demodulation.

In one embodiment, the phrase of combined decoding comprises a meaning of joint channel decoding.

In one embodiment, the decoding comprises demodulation.

In one embodiment, the decoding comprises channel decoding.

In one embodiment, if two PDCCH candidates are connected, the first node uses one of a first candidate decoding hypothesis, a third candidate decoding hypothesis or a fourth candidate decoding hypothesis to monitor the first-type channel in the two PDCCH candidates; if the two PDCCH candidates are not connected, the first node uses a second candidate decoding hypothesis to monitor the first-type channel in the two PDCCH candidates; the first candidate decoding hypothesis is to only perform combined decoding on the two PDCCH candidates; the second candidate decoding hypothesis is to perform independent decodings respectively on the two PDCCH candidates; the third candidate decoding hypothesis is to perform independent decoding on only one PDCCH candidate of the two PDCCH candidates and then combined decoding on the two PDCCH candidates; the fourth candidate decoding hypothesis is to perform independent decodings respectively on the two PDCCH candidates and then perform combined decoding on the two PDCCH candidates.

In one embodiment, if a configuration information block in a search space set comprises an index of a resource set, the search space set being associated with the resource set.

In one subembodiment, the resource set comprises a CORESET.

In one subembodiment, the resource set is a CORESET.

In one subembodiment, the index of the resource set comprises a ControlResourceSetId.

In one subembodiment, the configuration information block comprises all or part of information in an Information Element (IE).

In one subembodiment, the configuration information block is an Information Element (IE).

In one subembodiment, the configuration information block's name includes SearchSpace.

In one subembodiment, the configuration information block is a SearchSpace IE corresponding to the search space set.

In one subembodiment, the configuration information block indicates configuration information for the search space set, the configuration information comprising one or more of a monitoring cycle and offset measured in slots, a duration, a monitoring symbol in a slot, a number of PDCCH candidates or a search space type.

In one embodiment, if a search space set is associated with a resource set, a frequency-domain resource occupied by the search space set is a frequency-domain resource allocated to the resource set.

In one embodiment, if a search space set is associated with a resource set, a TCI state of the search space set is a TCI state of the resource set.

In one embodiment, if a search space set is associated with a resource set, a CCE-to-REG mapping type corresponding to a PDCCH candidate in the search space set is a CCE-to-REG mapping type of the resource set.

In one embodiment, if a search space set is associated with a resource set, a precoding granularity corresponding to a PDCCH candidate in the search space set is a precoding granularity of the resource set.

In one embodiment, a SearchSpace IE used for configuring the first search space set comprises a ControlResourceSetId corresponding to the given resource set.

In one embodiment, a frequency-domain resource occupied by the first search space set is a frequency-domain resource allocated to the given resource set.

In one embodiment, a TCI state of the first search space set is a TCI state of the given resource set.

In one embodiment, a CCE-to-REG mapping type corresponding to a PDCCH candidate in the first search space set is a CCE-to-REG mapping type of the given resource set.

In one embodiment, a precoding granularity corresponding to a PDCCH candidate in the first search space set is a precoding granularity of the given resource set.

In one embodiment, the fifth spatial state is used to configure QCL relation(s) between a DMRS port for a PDCCH transmitted in a CORESET associated with the second search space set and one or two reference signals.

In one embodiment, the fifth spatial state indicates one reference signal and one QCL type, a DMRS port for a PDCCH transmitted in the second search space set and the reference signal are QCL, with a corresponding QCL type being the said QCL type.

In one embodiment, the fifth spatial state indicates 2 reference signals and 2 QCL types, where the 2 reference signals respectively correspond to the 2 QCL types; a DMRS port for a PDCCH transmitted in the second search space set and the 2 reference signals are respectively QCL, with corresponding QCL types respectively being the said 2 QCL types.

In one subembodiment, the 2 QCL types are different.

In one embodiment, the QCL type is one of a QCL-TypeA, a QCL-TypeB, a QCL-TypeC or a QCL-TypeD.

In one embodiment, the QCL relation of a DMRS port for a PDCCH transmitted in the first search space set is unrelated to the fifth spatial state.

In one embodiment, if the first search space set and the second search space set are connected, the given resource set is connected with the fifth spatial state and the sixth spatial state; the sixth spatial state is used for configuring (a) QCL relation(s) between a DMRS port for a PDCCH being transmitted in the first search space set and one or two reference signals.

In one subembodiment, the fifth spatial state and the sixth spatial state respectively correspond to different TCI-State-Ids.

In one embodiment, if the first search space set and another search space set are connected, a number of spatial states connected with the given resource set is equal to 1 or 2.

In one embodiment, a given resource set is any resource set of the M resource sets; if the given resource set is configured with only one spatial state by an RRC signaling, the given resource set being connected with the spatial state.

In one embodiment, a given resource set is any resource set of the M resource sets; if the given resource set is configured with multiple spatial states by an RRC signaling and one spatial state among the multiple spatial states is activated by a MAC CE, the given resource set being connected with the spatial state.

In one embodiment, a given resource set is any resource set of the M resource sets; if the given resource set is configured with multiple spatial states by an RRC signaling and two spatial states among the multiple spatial states are activated by a MAC CE, the given resource set being connected with the two spatial states.

In one embodiment, a given resource set is any resource set of the M resource sets; a first given spatial state is used to configure QCL relation(s) between a DMRS port for a PDCCH transmitted in the given resource set and one or two reference signals, the given resource set being connected with the first given spatial state.

In one embodiment, a given resource set is any resource set of the M resource sets; a first given spatial state and a second given spatial state are respectively used to configure QCL relation(s) between a DMRS port for a PDCCH transmitted in the given resource set and one or two reference signals, the given resource set being connected with the first given spatial state and the second given spatial state.

Embodiment 8

Figure 8:
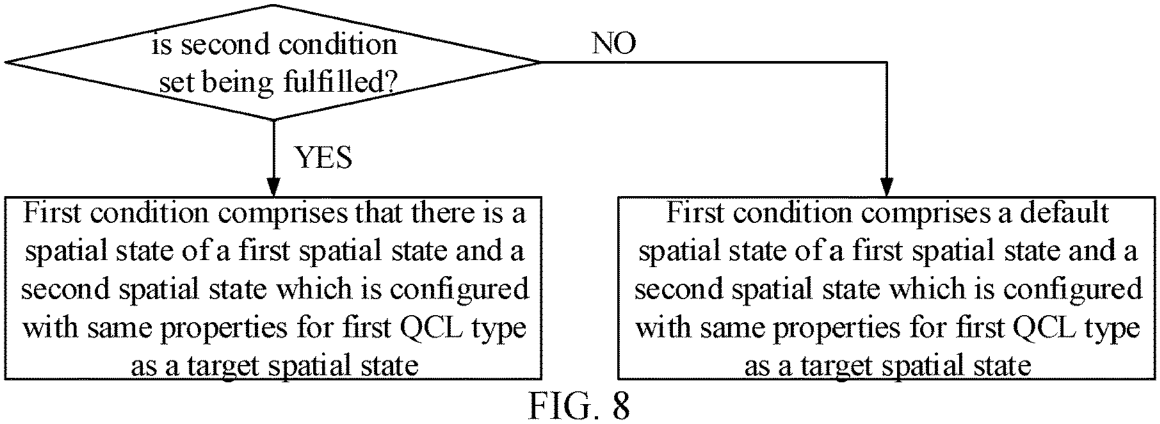
FIG. 8 illustrates a schematic diagram of whether a second condition set is fulfilled being used to determine a first condition according to one embodiment of the present disclosure.

Embodiment 8 illustrates a schematic diagram of whether a second condition set is fulfilled being used to determine a first condition according to one embodiment of the present disclosure; as shown in FIG. 8. In Embodiment 8, when the second resource set is connected with the first spatial state and the second spatial state and when the second condition set is fulfilled, the first condition comprises there being a spatial state of the first and the second spatial states being configured with a same property/properties for the first QCL Type as the target spatial state; when the second resource set is connected with the first spatial state and the second spatial state and when the second condition set is unfulfilled, the first condition comprises a default spatial state of the first spatial state and the second spatial state being configured with same properties for the first QCL Type as the target spatial state.

In one embodiment, whether the second condition set is fulfilled is used by the first node to determine the first condition.

In one embodiment, whether the second condition set is fulfilled is used by the second node to determine the first condition.

In one embodiment, when the first resource set is connected with only the first spatial state, the first condition is unrelated to whether the second condition set is fulfilled.

In one embodiment, the second condition set comprises at least one condition.

In one embodiment, the second condition set comprises only one condition.

In one embodiment, the second condition set comprises more than one condition.

In one embodiment, when there is one condition in the second condition set being fulfilled, the second condition set is fulfilled; when none of conditions in the second condition set is fulfilled, the second condition set is not fulfilled.

In one embodiment, when all conditions in the second condition set are fulfilled, the second condition set is fulfilled; when there is one condition in the second condition set being unfulfilled, the second condition set is not fulfilled.

In one embodiment, when the second resource set is connected with the first spatial state and the second spatial state, the first node autonomously determines the first condition according to whether the second condition set is fulfilled.

In one embodiment, the second condition set comprises a fourth condition; the fourth condition comprising a first reference signal and a second reference signal being simultaneously received by the first node; the first spatial state indicates the first reference signal and that a QCL type corresponding to the first reference signal is the first QCL type; the second spatial state indicates the second reference signal and that a QCL type corresponding to the second reference signal is the first QCL type.

In one embodiment, the second condition set only comprises the fourth condition.

In one embodiment, the second condition set comprises at least one condition other than the fourth condition.

Embodiment 9

Figure 9:
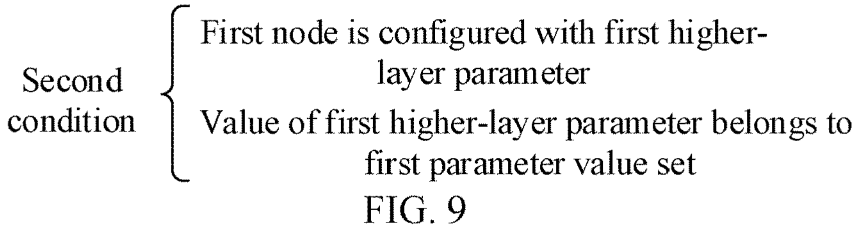
FIG. 9 illustrates a schematic diagram of a second condition according to one embodiment of the present disclosure.

Embodiment 9 illustrates a schematic diagram of a second condition according to one embodiment of the present disclosure, as shown in FIG. 9. In Embodiment 9, the second condition set comprises the second condition, the second condition comprising the first node being configured with the first higher-layer parameter and the first higher-layer parameter's value belonging to the first parameter value set, the first parameter value set comprising at least one parameter value.

In one embodiment, the second condition at least comprises the first node being configured with the first higher-layer parameter and the first higher-layer parameter's value belonging to the first parameter value set.

In one embodiment, the second condition only comprises the first node being configured with the first higher-layer parameter and the first higher-layer parameter's value belonging to the first parameter value set.

In one embodiment, the first higher-layer parameter is an RRC parameter.

In one embodiment, the first higher-layer parameter is configured by an IE.

In one embodiment, names for an IE configuring the first higher-layer parameter include "RepetitionSchemeConfig".

In one embodiment, names for an IE configuring the first higher-layer parameter include "PDSCH-Config".

In one embodiment, names for the first higher-layer parameter include "repetitionScheme".

In one embodiment, the first higher-layer parameter is a higher-layer parameter "repetitionScheme".

In one embodiment, the first higher-layer parameter is a higher-layer parameter "repetitionScheme-r16".

In one embodiment, the first parameter value set only comprises one parameter value.

In one embodiment, the first parameter value set comprises multiple parameter values.

In one embodiment, the first parameter value set comprises "fdmSchemeA" and "fdmSchemeB".

In one embodiment, the first parameter value set comprises one or more of "fdmSchemeA", "fdmSchemeB" or "tdmSchemeA".

In one embodiment, the second condition set only comprises the second condition.

In one embodiment, the second condition set comprises at least one condition other than the second condition.

Embodiment 10

Figure 10:
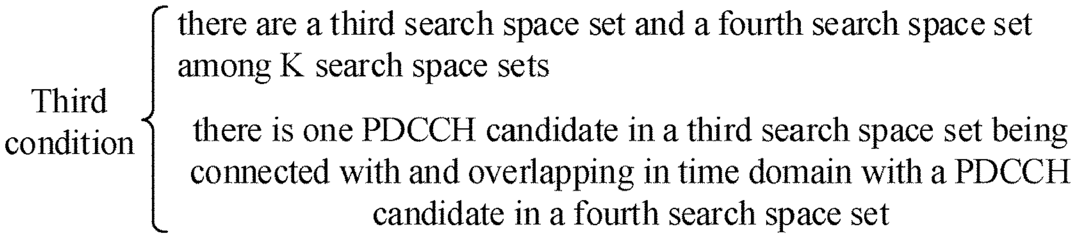
FIG. 10 illustrates a schematic diagram of a third condition according to one embodiment of the present disclosure.

Embodiment 10 illustrates a schematic diagram of a third condition according to one embodiment of the present disclosure, as shown in FIG. 10. In Embodiment 10, the first node is configured with the K search space sets; the second condition set comprises the third condition, the third condition comprising there being the third search space set and the fourth search space set among the K search space sets, where there is one PDCCH candidate in the third search space set being connected with and overlapping in time domain with one PDCCH candidate in the fourth search space set.

In one embodiment, the third condition at least comprises there being the third search space set and the fourth search space set among the K search space sets, where there is one PDCCH candidate in the third search space set being connected with and overlapping in time domain with one PDCCH candidate in the fourth search space set.

In one embodiment, the third condition only comprises there being the third search space set and the fourth search space set among the K search space sets, where there is one PDCCH candidate in the third search space set being connected with and overlapping in time domain with one PDCCH candidate in the fourth search space set.

In one embodiment, the K search space sets belong to a same Carrier.

In one embodiment, the K search space sets belong to a same BWP.

In one embodiment, the K search space sets belong to a same Cell.

In one embodiment, there are two search space sets among the K search space sets that belong to different Carriers.

In one embodiment, there are two search space sets among the K search space sets that belong to different Cells.

In one embodiment, the K search space sets are respectively identified by K search space set indexes, the K search space set indexes are respectively non-negative integers, and the K search space set indexes are mutually unequal.

In one subembodiment, the K search space set indexes are respectively SearchSpaceIds.

In one embodiment, the phrase that a PDCCH candidate and another PDCCH candidate are overlapping in time domain means that a PDCCH monitoring occasion to which the PDCCH candidate belongs and a PDCCH monitoring occasion to which the other PDCCH candidate belongs are overlapping in time domain.

In one embodiment, there is one PDCCH candidate in the third search space set being connected with and totally overlapping in time domain with one PDCCH candidate in the fourth search space set.

In one embodiment, there is one PDCCH candidate in the third search space set being connected with and partially overlapping in time domain with one PDCCH candidate in the fourth search space set.

In one embodiment, the third search space set and the fourth search space set are respectively two USS sets.

In one embodiment, the third search space set and the fourth search space set are respectively identified by two different SearchSpaceIds.

In one embodiment, the third search space set and the fourth search space set are connected.

In one embodiment, the third condition also comprises the third search space set and the fourth search space set being connected.

In one embodiment, the third condition also comprises that the first spatial relation is used to determine QCL relation(s) between a DMRS port for a PDCCH transmitted in the third search space set and one or two reference signals, and that the second spatial relation is used to determine QCL relation(s) between a DMRS port for a PDCCH transmitted in the fourth search space set and one or two reference signals.

In one embodiment, the third condition also comprises that the third search space set is associated with the second resource set, and that the fourth search space set is associated with the third resource set, the first spatial relation is used to determine QCL relation(s) between a DMRS port for a PDCCH transmitted in the second resource set and one or two reference signals, and the second spatial relation is used to determine QCL relation(s) between a DMRS port for a PDCCH transmitted in the third resource set and one or two reference signals.

In one subembodiment, the second resource set and the third resource set are respectively two different CORESETs.

In one subembodiment, the second resource set and the third resource set are respectively identified by two different resource set indexes.

In one embodiment, the second condition set only comprises the third condition.

In one embodiment, the second condition set comprises at least one condition other than the third condition.

In one embodiment, the second condition set comprises the second condition and the third condition.

In one embodiment, the second condition set comprises the second condition, the third condition and the fourth condition.

In one embodiment, the second condition set comprises at least one of the second condition, the third condition or the fourth condition.

Embodiment 11

Figure 11:
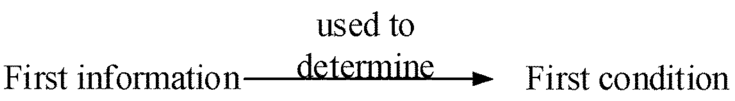
FIG. 11 illustrates a schematic diagram of first information used to determine a first condition according to one embodiment of the present disclosure.

Embodiment 11 illustrates a schematic diagram of first information used to determine a first condition according to one embodiment of the present disclosure, as shown in FIG. 11.

In one embodiment, when the second resource set is connected with the first spatial state and the second spatial state, the first information is used to determine the first condition.

In one embodiment, when the second resource set is connected with only the first spatial state, the first condition is unrelated to the first information.

In one embodiment, the first information is used to determine whether the first condition comprises a default spatial state of the first spatial state and the second spatial state being configured with same properties for the first QCL Type as the target spatial state, or comprises there is one of the first and the second spatial states being configured with a same property/properties for the first QCL Type as the target spatial state.

In one embodiment, the first information is carried by a higher layer signaling.

In one embodiment, the first information is carried by an RRC signaling.

In one embodiment, the first information is indicated by an IE.

In one embodiment, the first information is carried by a MAC CE signaling.

In one embodiment, the first information is carried by a physical layer signaling.

In one embodiment, the first information is carried by an L1 signaling.

In one embodiment, a first parameter is used to determine the first information.

In one subembodiment, the first parameter explicitly indicates the first information.

In one subembodiment, the first parameter implicitly indicates the first information.

In one subembodiment, if the first parameter's value belongs to a second parameter value set, the first condition comprises a default spatial state of the first spatial state and the second spatial state being configured with same properties for the first QCL Type as the target spatial state, the second parameter value set comprises at least one parameter value.

In one subembodiment, if the first parameter's value belongs to a third parameter value set, the first condition comprises there being a spatial state of the first spatial state and the second spatial state being configured with same properties for the first QCL Type as the target spatial state, the third parameter value set comprises at least one parameter value.

In one subembodiment, the second parameter value set and the third parameter value set do not comprise any shared parameter value.

In one subembodiment, the second parameter value set only comprises one parameter value.

In one subembodiment, the second parameter value set comprises multiple parameter values.

In one subembodiment, the third parameter value set only comprises one parameter value.

In one subembodiment, the third parameter value set comprises multiple parameter values.

In one subembodiment, if the first node is not configured with the first parameter, the first condition comprises a default spatial state of the first spatial state and the second spatial stats being configured with same properties for the first QCL Type as the target spatial state.

In one subembodiment, if the first node is configured with the first parameter, the first condition comprises there being a spatial state of the first spatial state and the second spatial state being configured with same properties for the first QCL Type as the target spatial state.

In one subembodiment, the first parameter is a higher-layer parameter.

In one subembodiment, the first parameter is indicated by a field in an IE.

In one subembodiment, the first parameter is indicated by a field in a ControlResourceSet IE used for configuring the second resource set.

In one subembodiment, the first parameter is indicated by a MAC CE.

In one subembodiment, the first parameter is related to the second resource set.

In one subembodiment, the first parameter is for the second resource set.

Embodiment 12

Figure 12:
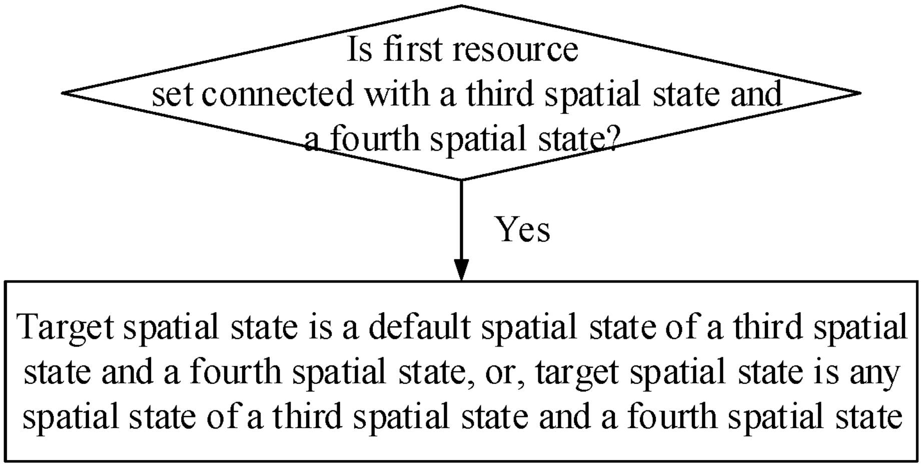
FIG. 12 illustrates a schematic diagram of a target spatial state when a first resource set is connected with a third spatial state and a fourth spatial state according to one embodiment of the present disclosure.

Embodiment 12 illustrates a schematic diagram of a target spatial state when a first resource set is connected with a third spatial state and a fourth spatial state according to one embodiment of the present disclosure; as shown in FIG. 12. In Embodiment 12, if the first resource set is connected with the third spatial state and the fourth spatial state, the target spatial state is a default spatial state of the third spatial state and the fourth spatial state, or, the target spatial state is any spatial state of the third spatial state and the fourth spatial state.

In one embodiment, when the second resource set is connected with just the first spatial state and the target spatial state is a default spatial state of the third and the fourth spatial states, the first condition comprises a default spatial state of the third spatial state and the fourth spatial state being configured with same properties for the first QCL Type as the first spatial state.

In one embodiment, when the second resource set is connected with the first spatial state and the second spatial state and the target spatial state is a default spatial state of the third spatial state and the fourth spatial state, the first condition comprises the default spatial state of the third spatial state and the fourth spatial state being configured with same properties for the first QCL type as the default spatial state of the first and the second spatial states; or, the first condition comprises there being a spatial state of the first and the second spatial states being configured with a same property/properties for the first QCL Type as the default spatial state of the third and the fourth spatial states.

In one embodiment, when the second resource set is connected with just the first spatial state and the target spatial state is any spatial state of the third and the fourth spatial states, the first condition comprises there being a spatial state of the third and the fourth spatial states that is configured with a same property/properties for the first QCL Type as the first spatial state.

In one embodiment, when the second resource set is connected with the first spatial state and the second spatial state and the target spatial state is any spatial state of the third and the fourth spatial states, the first condition comprises there being a spatial state of the third and the fourth spatial states being configured with a same property/properties for the first QCL type as the default spatial state of the first and the second spatial states; or, the first condition comprises there being a spatial state of the third and the fourth spatial states being configured with a same property/properties for the first QCL Type as one spatial state of the first and the second spatial states.

In one embodiment, the first condition is used to determine whether the target spatial state is a default spatial state of the third spatial state and the fourth spatial state or any spatial state of the third spatial state and the fourth spatial state.

In one embodiment, if the first condition comprises a default spatial state of the first spatial state and the second spatial state being configured with same properties for the first QCL Type as the target spatial state, the target spatial state being a default spatial state of the third and the fourth spatial states.

In one embodiment, if the first condition comprises there being a spatial state of the first spatial state and the second spatial state being configured with same properties for the first QCL Type as the target spatial state, the target spatial state being any spatial state of the third and the fourth spatial states.

In one embodiment, whether the target spatial state is a default spatial state of the third spatial state and the fourth spatial state or any spatial state of the third spatial state and the fourth spatial state is unrelated to the first condition.

In one embodiment, the third spatial state and the fourth spatial state respectively correspond to different TCI-State-Ids.

In one embodiment, the third spatial state indicates a fifth reference signal, while the fourth spatial state indicates a sixth reference signal, the fifth reference signal and the sixth reference signal being non-quasi co-located (non-QCL).

In one subembodiment, the third spatial state indicates that a QCL type corresponding to the fifth reference signal is the first QCL type, while the fourth spatial state indicates that a QCL type corresponding to the sixth reference signal is the first QCL type.

In one subembodiment, the fifth reference signal and the sixth reference signal are not Quasi Co-located while corresponding to the first QCL type.

In one embodiment, the first condition is related to both a number of spatial state(s) with which the second resource set is connected and a number of spatial state(s) with which the first resource set is connected.

Embodiment 13

Figure 13:
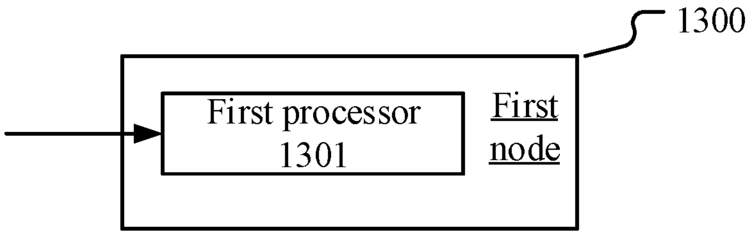
FIG. 13 illustrates a structure block diagram of a processing device in a first node according to one embodiment of the present disclosure.

Embodiment 13 illustrates a structure block diagram of a processing device used in a first node according to one embodiment of the present disclosure; as shown in FIG. 13. In FIG. 13, a processing device 1300 in a first node is comprised of a first processor 1301.

In Embodiment 13, the first processor 1301 determines a first resource set and a first resource set group from M resource sets, and monitors a first-type channel in the first resource set group in a first time window, where M is a positive integer greater than 1.

In Embodiment 13, any two of the M resource sets are overlapping in time domain in the first time window, and the first resource set group comprises the first resource set; any resource set among the M resource sets is connected with one or two spatial states; a second resource set is any of the M resource sets different from the first resource set; whether a first condition is fulfilled is used to determine whether the second resource set belongs to the first resource set group; the first condition is related to the number of spatial state(s) with which the second resource set is connected; the first resource set is connected with a target spatial state; when the second resource set is connected with only a first spatial state, the first condition comprises the first spatial state and the target spatial state being configured with same properties for a first QCL Type; when the second resource set is connected with a first spatial state and a second spatial state, the first condition comprises a default spatial state of the first spatial state and the second spatial state being configured with same properties for the first QCL Type as the target spatial state, or, the first condition comprises there being a spatial state of the first and the second spatial states being configured with a same property/properties for the first QCL Type as the target spatial state.

In one embodiment, a given resource set is any resource set among the M resource sets, with a first search space set being associated with the given resource set; if the first search space set and a second search space set are linked, the given resource set is connected with a fifth spatial state; the fifth spatial state is used for configuring (a) QCL relation(s) between a DMRS port for a PDCCH being transmitted in the second search space set and one or two reference signals.

In one embodiment, when the second resource set is connected with the first spatial state and the second spatial state, whether a second condition set is fulfilled is used to determine the first condition; when the second condition set is fulfilled, the first condition comprises there being a spatial state of the first and the second spatial states being configured with a same property/properties for the first QCL Type as the target spatial state; when the second condition set is unfulfilled, the first condition comprises a default spatial state of the first spatial state and the second spatial state being configured with same properties for the first QCL Type as the target spatial state.

In one embodiment, the second condition set comprises a second condition, the second condition comprising the first node being configured with a first higher-layer parameter and the first higher-layer parameter's value belonging to a first parameter value set, the first parameter value set comprising at least one parameter value.

In one embodiment, the first node is configured with K search space sets, where K is a positive integer greater than 1; the second condition set comprises a third condition, the third condition comprising there being a third search space set and a fourth search space set among the K search space sets, where there is one PDCCH candidate in the third search space set being connected with and overlapping in time domain with one PDCCH candidate in the fourth search space set.

In one embodiment, the first processor 1301 receives first information; herein, the first information is used to determine the first condition.

In one embodiment, when the first resource set is connected with a third spatial state and a fourth spatial state, the target spatial state is a default spatial state of the third spatial state and the fourth spatial state, or, the target spatial state is any spatial state of the third spatial state and the fourth spatial state.

In one embodiment, the first node is a UE.

In one embodiment, the first node is a relay node.

In one embodiment, the first processor 1301 comprises at least one of the antenna 452, the receiver 454, the receiving processor 456, the multi-antenna receiving processor 458, the controller/processor 459, the memory 460 or the data source 467 in Embodiment 4.

Embodiment 14

Figure 14:
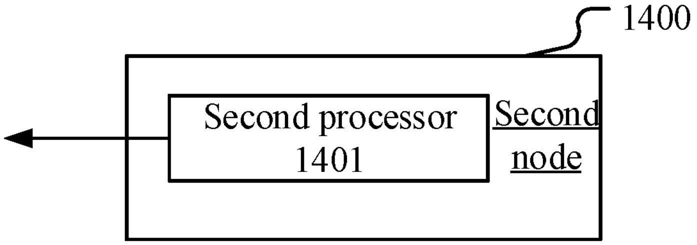
FIG. 14 illustrates a structure block diagram of a processing device used in a second node according to one embodiment of the present disclosure.

Embodiment 14 illustrates a structure block diagram of a processing device used in a second node according to one embodiment of the present disclosure; as shown in FIG. 14. In FIG. 14, a processing device 1400 in a second node is comprised of a second processor 1401.

In Embodiment 14, the second processor 1401 transmits or drops transmission of a first-type channel in a first resource set group in a first time window.

In Embodiment 14, the first resource set group comprises at least one of M resource sets, M being a positive integer greater than 1; any two of the M resource sets are overlapping in time domain in the first time window; a target receiver for the first-type channel determines a first resource set and the first resource set group from the M resource sets, and monitors the first-type channel in the first resource set group; the first resource set group comprises the first resource set; any of the M resource sets is connected with one or two spatial states; a second resource set is any of the M resource sets different from the first resource set; whether a first condition is fulfilled is used to determine whether the second resource set belongs to the first resource set group; the first condition is related to the number of spatial state(s) with which the second resource set is connected; the first resource set is connected with a target spatial state; when the second resource set is connected with only a first spatial state, the first condition comprises the first spatial state and the target spatial state being configured with same properties for a first QCL Type; when the second resource set is connected with a first spatial state and a second spatial state, the first condition comprises a default spatial state of the first spatial state and the second spatial states being configured with same properties for the first QCL Type as the target spatial state, or, the first condition comprises there being a spatial state of the first and the second spatial states being configured with a same property/properties for the first QCL Type as the target spatial state.

In one embodiment, a given resource set is any resource set among the M resource sets, with a first search space set being associated with the given resource set; if the first search space set and a second search space set are linked, the given resource set is connected with a fifth spatial state; the fifth spatial state is used for configuring (a) QCL relation(s) between a DMRS port for a PDCCH being transmitted in the second search space set and one or two reference signals.

In one embodiment, when the second resource set is connected with the first spatial state and the second spatial state, whether a second condition set is fulfilled is used to determine the first condition; when the second condition set is fulfilled, the first condition comprises there being a spatial state of the first and the second spatial states being configured with a same property/properties for the first QCL Type as the target spatial state; when the second condition set is unfulfilled, the first condition comprises a default spatial state of the first spatial state and the second spatial state being configured with same properties for the first QCL Type as the target spatial state.

In one embodiment, the second condition set comprises a second condition, the second condition comprising the target receiver for the first-type channel being configured with a first higher-layer parameter and the first higher-layer parameter's value belonging to a first parameter value set, the first parameter value set comprising at least one parameter value.

In one embodiment, the target receiver for the first-type channel is configured with K search space sets, where K is a positive integer greater than 1; the second condition set comprises a third condition, the third condition comprising there being a third search space set and a fourth search space set among the K search space sets, where there is one PDCCH candidate in the third search space set being connected with and overlapping in time domain with one PDCCH candidate in the fourth search space set.

In one embodiment, the second processor 1401 transmits first information; herein, the first information is used to determine the first condition.

In one embodiment, when the first resource set is connected with a third spatial state and a fourth spatial state, the target spatial state is a default spatial state of the third spatial state and the fourth spatial state, or, the target spatial state is any spatial state of the third spatial state and the fourth spatial state.

In one embodiment, the second node is a base station.

In one embodiment, the second node is a UE.

In one embodiment, the second node is a relay node.

In one embodiment, the second processor 1401 comprises at least one of the antenna 420, the transmitter 418, the transmitting processor 416, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, vehicles, automobiles, RSU, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, Road Side Unit (RSU), drones, test equipment like transceiving device simulating partial functions of base station or signaling tester.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) for wireless communications, the UE comprising:

a transceiver;

a processor; and a non-transitory computer-readable medium storing instructions that, when executed by the processor, causes the transceiver and the processor to:

select a first resource set group from a plurality of resource sets, wherein any two resource sets from the plurality of resource sets overlap in a time window, and wherein the first resource set group comprises a first resource set, and wherein any resource set from the plurality of resource sets is associated with one spatial state or two spatial states, select a second resource set from the plurality of resource sets, wherein the second resource set is different from the first resource set, monitor a first-type channel in the first resource set group in the time window, and determine that the second resource set belongs to the first resource set group based on one of:

for the second resource set associated with one spatial state, determining that a spatial state associated with the second resource set is configured with same properties for a first Quasi-Colocation (QCL) Type as a target spatial state associated with the first resource set, for the second resource set associated with two spatial states, determining that a default spatial state of the two spatial states associated with the second resource set is configured with same properties for the first QCL Type as the target spatial state, or for the second resource set associated with two spatial states, determining that one of the two spatial states associated with the second resource set is configured with same properties for the first QCL Type as the target spatial state.

2. The UE according to claim 1, wherein each resource set from the plurality of resource sets is associated with a search space set, and wherein a first search space set is associated with a given resource set, and wherein the first search space set and a second search space set are linked, and wherein the given resource set is associated with a fifth spatial state, and wherein the fifth spatial state is used for configuring a QCL relationship between at least one Demodulation Reference Signal (DMRS) port for a Physical Downlink Control Channel (PDCCH) being transmitted in the second search space set and one or two reference signals.

3. The UE according to claim 1, wherein the second resource set is associated with a first spatial state and a second spatial state, and wherein the UE is configured with a first higher-layer parameter associated with a first parameter value set comprising at least one parameter value, and wherein the UE is configured with a plurality of search space sets comprising a third search space set and a fourth search space set, and wherein a PDCCH candidate in the third search space set is linked to and overlaps in time domain with a PDCCH candidate in the fourth search space, and wherein the first higher-layer parameter or the PDCCH candidate are used to select the default spatial or one of the two spatial states associated with the second resource set for determining that the second resource set belongs to the first resource set group.

4. The UE according to claim 1, wherein the transceiver and the processor are further configured to:

receive first information, wherein the first information is used to determine that the second resource set belongs to the first resource set group.

5. The UE according to claim 1, wherein the first resource set is associated with a third spatial state and a fourth spatial state, and wherein the target spatial state is a default spatial state of the third spatial state and the fourth spatial state, or, the target spatial state is any spatial state of the third spatial state and the fourth spatial state.

6. A method in a user equipment (UE) for wireless communications, the method comprising:

selecting a first resource set group from a plurality of resource sets, wherein any two resource sets from the plurality of resource sets overlap in a time window, and wherein the first resource set group comprises a first resource set, and wherein any resource set from the plurality of resource sets is associated with one spatial state or two spatial states, selecting a second resource set from the plurality of resource sets, wherein the second resource set is different from the first resource set;

monitoring a first-type channel in the first resource set group in the time window; and determining that the second resource set belongs to the first resource set group based on one of:

for the second resource set associated with one spatial state, determining that a spatial state associated with the second resource set is configured with same properties for a first Quasi-Colocation (QCL) Type as a target spatial state associated with the first resource set, and for the second resource set associated with two spatial states, determining that a default spatial state of the two spatial states associated with the second resource set is configured with same properties for the first QCL Type as the target spatial state, or for the second resource set associated with two spatial states, determining that one of the two spatial states associated with the second resource set is configured with same properties for the first QCL Type as the target spatial state.

7. The method according to claim 6, wherein each resource set from the plurality of resource sets is associated with a search space set, and wherein a first search space set is associated with a given resource set, and wherein the first search space set and a second search space set are linked, and wherein the given resource set is associated with a fifth spatial state, and wherein the fifth spatial state is used for configuring a QCL relationship between at least one Demodulation Reference Signal (DMRS) port for a Physical Downlink Control Channel (PDCCH) being transmitted in the second search space set and one or two reference signals.

8. The method according to claim 6, wherein the second resource set is associated with a first spatial state and a second spatial state, and wherein the UE is configured with a first higher-layer parameter associated with a first parameter value set comprising at least one parameter value, and wherein the UE is configured with a plurality of search space sets comprising a third search space set and a fourth search space set, and wherein a PDCCH candidate in the third search space set is linked to and overlaps in time domain with a PDCCH candidate in the fourth search space, and wherein the first higher-layer parameter or the PDCCH candidate are used to select the default spatial state or one of the two spatial states associated with the second resource set for determining that the second resource set belongs to the first resource set group.

9. The method according to claim 6, comprising:

receiving first information, wherein the first information is used to determine that the second resource set belongs to the first resource set group.

10. The method according to claim 6, wherein the first resource set is associated with a third spatial state and a fourth spatial state, and wherein the target spatial state is a default spatial state of the third spatial state and the fourth spatial state, or, the target spatial state is any spatial state of the third spatial state and the fourth spatial state.

* * * * *